Dec. 2, 1952　　J. W. HORTON ET AL　　2,619,733
APPARATUS FOR THE MAINTENANCE OF TRUE BEARING
Filed June 6, 1946　　　　　　　　　　　　　　　3 Sheets-Sheet 1

Inventors
JOSEPH W. HORTON
JAMES B. HAYNES
GLENN D. GILLETT
RICHARD G. STEPHENSON
By M.Q.Hayes
Attorney

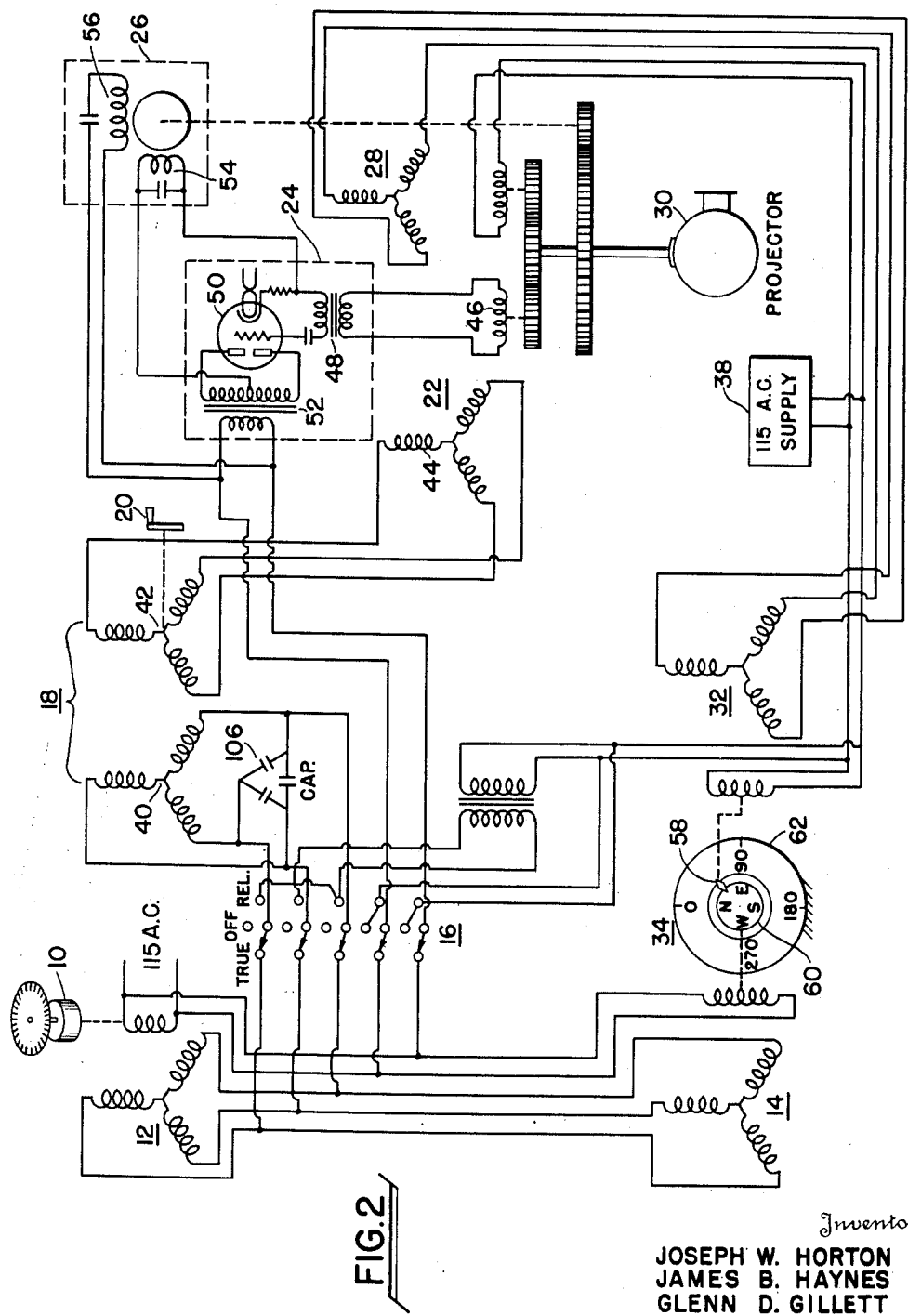

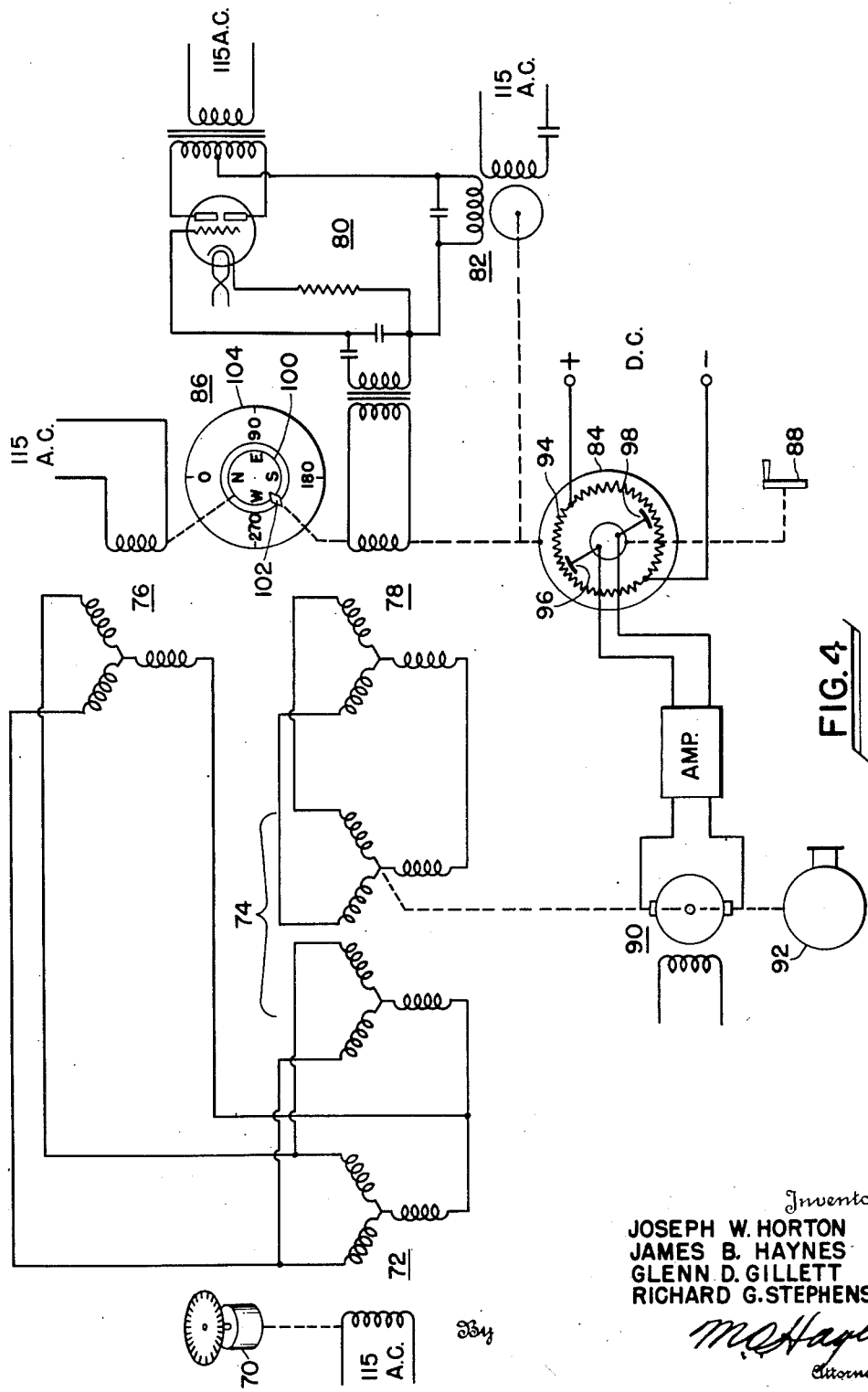

Patented Dec. 2, 1952

2,619,733

UNITED STATES PATENT OFFICE 2,619,733

APPARATUS FOR THE MAINTENANCE OF TRUE BEARING

Joseph Warren Horton, Ipswich, Mass., James Burney Haynes, New London, Conn., Glenn D. Gillett, Alexandria, Va., and Richard G. Stephenson, Tabor, N. J., assignors to the United States of America as represented by the Secretary of the Navy Application June 6, 1946, Serial No. 674,746

5 Claims. (Cl. 33—222)

Our invention relates to apparatus for maintaining true bearing of a rotatable head mounted on a movable craft. More particularly, we disclose an improved device for the maintenance of true bearing of a rotatable head such as a sonar projector head mounted on shipboard for search purposes.

It has been common practice for the projector head of sonar gear to maintain a fixed bearing relative to the craft on which it is mounted subject to a deviation under the manual control of an operator. A maintained relative bearing device suffers from the disadvantage that the operator must make constant correction in order to maintain the projector directed at a desired target during the time that the carrying ship is executing turns. The duties of the operator are especially burdensome when the craft is of such size and speed as to allow turns to be made very quickly. In order to enable a more orderly search procedure, we have found it desirable for the projector head to be automatically adjusted in azimuth to maintain a fixed true bearing in spite of executed turns or yawing of the craft.

In accordance with our invention, the bearing of the ship's compass is utilized to automatically adjust the orientation of a projector head.

Further, in accordance with our invention, means are provided to manually adjust the desired deviation between true north and the bearing of the projector head in order to enable a more orderly search procedure.

Also, in accordance with our invention, means are disclosed for more accurately maintaining true bearing of a shipboard searching head in spite of the rapid rate of yaw and the execution of sharp turns associated with vessels of small size.

Further, in accordance with our invention, means are provided for switching from one current source to another in order to reduce the power drain from a current source of relatively low capacity under conditions of maintained relative bearing and to allow operation upon failure of the normal ship's supply.

Our invention also resides in features of construction, combination and arrangement herein described or disclosed.

Referring to the drawings:

Figure 2 is a wiring diagram associating the components shown in Figure 1.

Figure 4 is a schematic wiring diagram of the components illustrated in Figure 3.

Figure 1:
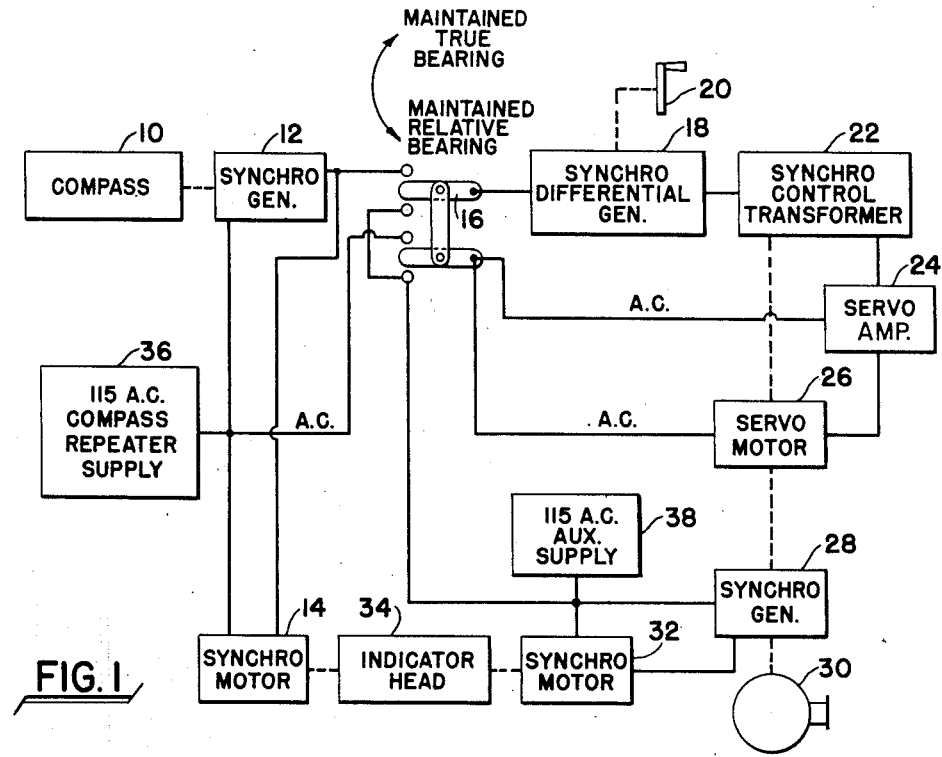
Figure 1 is a block diagram of one embodiment of our invention including switching means.

Figure 1 is a simplified block diagram of the preferred form of my device. A compass 10 mechanically drives a synchro generator 12 which serves two purposes: First, it drives a synchro motor 14; secondly, it drives a synchro differential generator 18 with the switch 16 in the upper or maintained true bearing position. The position of the rotor with respect to the stator of the differential generator is adjusted by means of handwheel 20. The output winding of the synchro differential generator 18 is fed into the stator of a synchro control transformer 22, the output of which in turn feeds into the servo amplifier 24 to control the operation of servomotor 26. Connected on the same shaft with servomotor 26, are the synchro control transformer 22, a synchro generator 28 and the rotatable head 30 which it is desired to control.

The synchro generator 28 controls the position of a rotor in the synchro motor 32. Both the synchro motor 14 and the synchro motor 32 operate indicating means in the indicator head 34.

With the switch 16 in the upper position, the servo amplifier 24 and the servomotor 26 obtain A. C. excitation from the compass repeater power supply 36. With the switch 16 in the lower position, it will be seen that the synchro differential generator 18, the servo amplifier 24 and the servomotor 26 are excited from a 115 volt A. C. auxiliary supply 38. This enables the device to function in spite of the failure of the compass repeater supply 36.

The operation can be more readily understood with reference to the wiring diagram of Figure 2. It will be seen that the synchro generators 12 and 28 and the synchro motors 14 and 32 consist of a star-connected stator winding and a single rotor winding. This equipment is of a type commonly used for remote positioning purposes. In use, the star winding of a generator is connected in parallel with the star winding of a motor and the two rotor windings are connected in parallel across a common A. C. source. When the rotor of a generator is turned with respect to the winding on the stator, the resultant direction of the magnetism in the stator of the motor rotates to a new position and the rotor of the motor is urged around to a new equilibrium position.

A control transformer of the type indicated at 22 consists of a star-connected stator and a single rotor winding much the same as that found in the motor or generator just discussed. In the case of the transformer, however, the windings are designed to carry less current and the rotor winding normally controls the grid circuit of a servo amplifier.

A differential generator such as that shown at 18 in the drawing has as an added feature a star-connected rotor winding. In use a differential generator is commonly connected intermediate a generator and motor so that the equilibrium position assumed by the rotor of the motor may be caused to deviate from the position which would normally be caused by the generator by an amount determined by the adjustable rotor setting of the differential generator. Each of the above types of synchro devices is inherently fast in operation.

It will be seen from Figure 2 that the output of the generator 12 is normally fed into the input winding of the differential generator 18 through the five-gang three-position switch 16. The output winding 42 of the differential generator 18 is used to excite the stator winding 44 of a control transformer 22. The rotor winding 46, which is mechanically coupled to the projector 30, is fed into the transformer 48 of the servo amplifier 24. The signal in the secondary of the transformer 48 controls the grid of a vacuum tube 50 having two anodes. The anodes receive voltage from a transformer 52. The output of the servo amplifier 24 is fed into one winding of a two-phase A. C. servomotor 26. The other winding 56 is supplied in the conventional manner from the common power source. It will be understood that the design of servo amplifier 24 and servo driving means 26 are shown for purposes of illustration only and that additional stages of amplification, or in fact an entirely different servo system, may be used if desired. It is required, however, that the servo system respond to the magnitude and phasing of the voltage appearing across the rotor winding 46 of the control transformer 22 and that the system be of adequate power to quickly rotate the projector head.

The rotor of the servomotor 26 is mechanically coupled to the projector head 30. Also mechanically coupled to the projector head is synchro generator 28 controlling the synchro motor 32 coupled to the pointer 58 of the indicator head 34.

The synchro motor 14 controlled by the synchro generator 12 controls the central true bearing scale 60 in the indicator head 34. Placed about the rotatable scale 60 and cooperating therewith is a fixed scale 62 graduated in angle of azimuth. The position of the projector with respect to the vessel is transmitted by the synchro generator 28 and synchro motor 32 to indicate by means of the pointer 58 the relative bearing of the projector head on the scale 62 and the true bearing of the projector head on the scale 60.

With the switch in the position shown and without other adjustments being made, the projector head will constantly maintain a true bearing. This is seen as follows: With the carrying craft proceeding in a constant direction the projector head will remain at a constant relative bearing on the craft. As the vessel turns the compass 10 will cause a turning of the rotor of synchro generator 12 producing a signal in the stator winding. Such signal is transmitted through windings 40 and 42 of the differential generator into stator winding 44 of the control transformer 22. This will cause a voltage to be induced across the rotor winding 46 causing a signal to be applied on the grids of vacuum tube 50. This signal on the grids will be properly phased to cause current to flow through only one of the anodes thus determining the direction of current flow through winding 54 of the servomotor 26. The magnitude of current flow will be dependent upon the magnitude of the signal generated in the rotor of the control transformer 22. Such current flow will cause rotation of the rotor of the servomotor 26 in a manner well known in the art to drive the projector head 30 and the rotor of the control transformer to a new equilibrium position in which the signal induced in the winding 46 of the control transformer is zero.

With the switch 16 in the opposite position the relative bearing of the projector head will be maintained. Instead of input winding 40 of the differential generator 18 being supplied from the synchro generator 12 associated with the ship compass, it will be supplied instead from an auxiliary A. C. current supply 38. Servo amplifier 24 and servomotor 26 under conditions of maintained relative bearing will also be excited from the power source 38. Under such circumstances, the projector head 30 will remain in a fixed orientation with respect to the vessel unless the adjusting handwheel 20 is turned whereupon the control transformer will cause operation of the servomotor as outlined above until a new equilibrium position is reached.

The use of the "true bearing"-"relative bearing" switch 16 greatly increases the flexibility of the underwater search equipment. If desired, for example, the switch could be thrown into the "relative bearing" position and the handwheel 20 adjusted until the projector points directly ahead. At such time as contact is made with an underwater target, the switch may be thrown to the "true bearing" position and an initial adjustment of the handwheel 20 made to align the projector and target. Subsequently the projector will continue to point in the general direction of the target regardless of the yawing or maneuvering of the carrying vessel. Slight corrections will have to be made from time to time as the true bearing of the target from the carrying vessel is slightly changed. It will be obvious, however, that the effort on the part of the operator will be considerably less and the probability of maintaining contact correspondingly increased.

It will be noted from Figures 1 and 2 that under maintained relative bearing conditions additional contacts on switch 16 cause the alternating current excitation of the servo amplifier 24, the servomotor 26 and the synchro differential generator 18 to be drawn from the auxiliary supply 38 thereby reducing the load on the compass repeater supply 36. This is obviously advantageous where the compass repeater power supply is of limited capacity and where it is desired that the projector head remain under control in spite of failure of the normal ship's compass supply.

Figure 3:
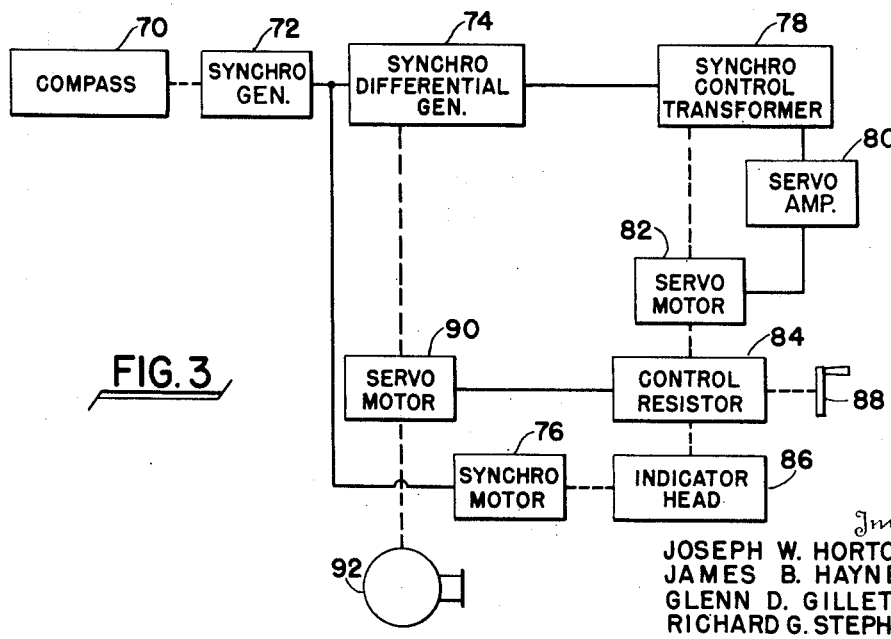
Figure 3 is a block diagram of another embodiment of my invention using direct current in a portion of the control circuit.

Figure 3 is a simplified block diagram of a modification of our invention in which direct current is utilized for control purposes in a portion of the circuit. Compass 70 drives a synchro generator 72 which in turn supplies a synchro differential generator 74 and a synchro motor 76. The output of the synchro differential generator is fed into a synchro control transformer 78 controlling servo amplifier 80 and hence servomotor 82. Coupled to the driving shaft of servomotor 82 are the synchro control transformer rotor, one of the relatively movable parts of the control resistor 84, and a pointer within the indicator head 86. The manual controlling handwheel 88 is coupled to the other part of the resistor. The output voltage from the control resistor 84 is utilized to control a second servo motor 90 which is mechanically coupled to the differential generator 74 and the projector head 92. For purposes of simplicity no A. C. source has been shown.

The operation of this modification is more readily seen with reference to Figure 4. The circuit as disclosed will maintain true bearing and while no provision is made for switching into a relative bearing position, it will be obvious to one skilled in the art that such a switch may be applied to this circuit in accordance with the teachings of the first embodiment. As in the case of the embodiment shown in Figures 1 and 2, the output signal produced by the synchro generator 72 mechanically coupled to the ship's compass 70 passes through a differential generator 74 producing a signal in the output winding of the control transformer 78 causing operation of the servo amplifier 80 and rotation of the servomotor 82. The servomotor 82 is mechanically coupled to the rotor of the control transformer 78 to cause the control transformer to assume a new position. In so doing, however, the resistor element 94 in control resistor 84 is caused to rotate with respect to the diametrically placed wiper arms 96 and 98. Such motion relatively displaces the wiper arm from the equilibrium position illustrated and a D. C. voltage is produced at the output of the control resistor. This output voltage may be amplified if desired by thyratron tubes or similar means in a manner well known in the art. Voltage appearing across the terminals of the D. C. servomotor 90 will cause rotation of the shaft and consequent rotation of the projector head 92 and the rotor of the differential generator 74. Such rotation will cause a signal to appear across the rotor of the control transformer 78 resulting in rotation of the servomotor 82 in such a direction as to cancel out the signal induced in the rotor of the control transformer and simultaneously to restore the initial angular relationship between the resistor element 94 and the wiper arms 96 and 98 to produce zero D. C. output voltage. In the above discussion, it has been assumed that the signal initiated by the generator 72 associated with the compass and the signal generated by turning of the rotor in the differential generator 74 have acted separately to restore the system to a new equilibrium positon. Actually, the two signals effect the system concurrently and readjustment takes place in a smooth and stepless manner.

As in the modifications shown in Figures 1 and 2, manual means are provided for varying the deviation between the maintained true bearing of the projector head and true north. In this case, the handwheel 88 is coupled to the shaft to which the resistor wiper arms 96 and 98 are attached. Movement of the handwheel 88 causes relative motion between the wiper arm and the resistor element 94 away from the equilibrium no-voltage position. This results in rotation of the servomotor 90, rotation of the rotor of the differential generator 74, and consequent rotation of the servomotor 82 to drive the rotatable resistor element 94 back to the equilibrium position illustrated.

In the present embodiment, a true bearing scale 100 is driven by synchro motor 76, while an indicating pointer 102 is driven by the servomotor 82. A fixed scale 104 is graduated in azimuth to give the relative bearing of the projector head 92 with respect to the carrying craft.

In practice, the location of the handwheel will be controlled by mechanical considerations of the particular installation and by the desirability of having the handwheel in close proximity to the indicating head.

While my disclosure has been drawn particularly to control of the projector head for underwater sound gear, it will be obvious that the teachings included herein are equally applicable to other types of searching apparatus utilizing a rotatable head. Such alternate types of apparatus may include those utilizing high frequency radio waves or infra-red radiation.

In order to reduce the exciting current of the various synchro devices, it may be desirable to add capacitance closely adjacent the synchro device. As an example, I have shown capacitance 106 placed across the input winding 40 of differential generator 18.

It will be seen above that true bearing apparatus constructed in accordance with our teachings will facilitate tracking of an underwater target, will be rapid in response and will enable more accurate control with less effort on the part of an operator. While we have shown and described but two embodiments of our invention, it will appear to those skilled in the art that various changes and modifications may be made without departing from our invention and we, therefore, aim in the appended claims to cover all such changes and modifications as fall within the true scope of our invention.

What we claim is:

1. A device for maintaining true bearing of a rotatable projector head mounted on a moving craft comprising a compass, synchro generator means coupled to said compass, synchro differential generator means having an input winding supplied by said generator means, synchro control transformer means excited by the differential generator means, servo amplifier means responsive to the output of said transformer means, first servomotor means controlled by said servo amplifier means, control resistor means, said first servomotor means mechanically coupled to said transformer and said control resistor, second servomotor means responsive to the said control resistor means and mechanically coupled to said differential generator and said rotatable projector head whereby said rotatable projector head is caused to constantly assume a predetermined true bearing.

2. The subject matter included in claim 1, said control resistor means including manual adjustment means whereby the maintained azimuthal deviation between the projector head and true north may be adjusted to any predetermined value.

3. A system for maintaining true bearing of a rotatable member mounted on a moving craft comprising the combination of a member adapted to be mounted on a movable craft and rotatable with respect thereto, a compass including a movable shaft whose position depends on the direction in which said craft is headed, a synchro generator having a movable winding coupled to the movable shaft of said compass, a differential synchro means having stationary and movable windings, the input to said differential synchro means being supplied from the output of said synchro generator, a synchro control transformer including stationary and movable windings having its input fed by the output of said differential synchro means, a servo amplifier responsive to the output of said synchro control transformer, a first servomotor energized by the output of said servo amplifier, a potentiometer having movable contacts and a pair of input and a pair of output terminals, one of said pairs of terminals being connected with the movable contacts of said potentiometer, a source of voltage coupled to the input of said potentiometer, said movable contacts having a reference position providing zero output voltage across said output terminals and other positions on both sides of said reference position which provide a voltage across said output terminals which has a polarity depending on the side of said reference position to which said movable contacts are located, a second servomotor energized from the output of said potentiometer, the shaft of said first servomotor being coupled to the movable windings of said synchro control transformer and to the said potentiometer for moving the movable contacts thereof, the shaft of said second servomotor being coupled to the movable windings of said differential synchro, said rotatable member being connected for movement with the rotor of said second servomotor.

4. The invention defined in claim 3 but further characterized by manual adjustable means for adjusting said movable contacts.

5. The invention defined in claim 3 but further characterized by an indicating means comprising a first scale graduated in azimuth, a movable scale graduated in azimuth, a motion transmitting means for coupling the movement of said compass to said movable scale, and a movable index marker coupled to the shaft of the first servomotor for movement therewith.

JOSEPH WARREN HORTON.
JAMES BURNEY HAYNES.
GLENN D. GILLETT.
RICHARD G. STEPHENSON.

REFERENCES CITED

The following references are of record in the file of this patent:

UNITED STATES PATENTS

| Number | Name | Date |
|---|---|---|
| 1,215,425 | Sperry | Feb. 13, 1917 |
| 1,814,842 | Murphy | July 14, 1931 |
| 1,926,251 | Von Mayrhauser | Sept. 12, 1933 |
| 1,998,939 | Mittag | Apr. 23, 1935 |
| 2,415,429 | Kellogg et al. | Feb. 11, 1947 |
| 2,415,430 | Frische et al. | Feb. 11, 1947 |
| 2,422,180 | Broadbent | June 17, 1947 |
| 2,423,438 | Dawson | July 8, 1947 |
| 2,433,837 | Dawson | Jan. 8, 1948 |

FOREIGN PATENTS

| Number | Country | Date |
|---|---|---|
| 1,024 | Great Britain | Jan. 14, 1911 |
| 594,563 | France | June 27, 1925 |

OTHER REFERENCES

TM 11-467, War Dept., "Radar System Fundamentals," printed April 28, 1944, published July 5, 1946, page 346.